United States Patent
Lochocki, Jr. et al.

(10) Patent No.: US 10,041,586 B2
(45) Date of Patent: Aug. 7, 2018

(54) METHOD AND APPARATUS FOR TRANSMISSION RANGE MONITORING

(71) Applicant: GM GLOBAL TECHNOLOGY OPERATIONS LLC, Detroit, MI (US)

(72) Inventors: Ronald F. Lochocki, Jr., Ypsilanti, MI (US); Moussa Ndiaye, Canton, MI (US); Jill A. Hampton, Zionsville, IN (US); Joel H. Gunderson, Canton, MI (US); Angela G. Hundley, Milford, MI (US); Scott D. Biggs, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

(21) Appl. No.: 15/079,608

(22) Filed: Mar. 24, 2016

(65) Prior Publication Data

US 2017/0276239 A1  Sep. 28, 2017

(51) Int. Cl.
*F16H 61/12* (2010.01)
*F16H 61/02* (2006.01)

(52) U.S. Cl.
CPC ........ *F16H 61/12* (2013.01); *F16H 61/0204* (2013.01)

(58) Field of Classification Search
None
See application file for complete search history.

(56) References Cited

U.S. PATENT DOCUMENTS

| | | | |
|---|---|---|---|
| 2007/0213164 A1* | 9/2007 | Tasaka | F16H 61/12 475/119 |
| 2011/0137534 A1* | 6/2011 | Kim | B60K 20/02 701/62 |
| 2011/0320096 A1* | 12/2011 | Itazu | F16H 61/12 701/58 |
| 2012/0059538 A1* | 3/2012 | Morris | B60W 10/08 701/22 |
| 2013/0233111 A1* | 9/2013 | Owatari | F16H 61/12 74/473.11 |
| 2015/0285372 A1* | 10/2015 | Shirai | B60K 23/00 701/51 |
| 2015/0300423 A1* | 10/2015 | Takeda | B60K 6/442 701/22 |
| 2016/0017987 A1* | 1/2016 | Yoshimura | F16H 61/12 701/63 |

* cited by examiner

*Primary Examiner* — Justin Holmes
(74) *Attorney, Agent, or Firm* — Quinn IP Law

(57) ABSTRACT

A vehicle includes a prime mover, a transmission having an electronic transmission range selection (ETRS) system, a user interface device that generates an electric range selection (ERS) signal in response to a selected operating range, and a controller. The controller processes the ERS signal and determines the operating range and executes a remedial control action when the incorrect powerflow is detected. The remedial action may include interrupting powerflow. A control apparatus includes the user interface device and controller. A method includes determining if a powerflow fault condition is present, including comparing clutches commanded on against a calibrated list of clutches not permitted to be on, and one or both of comparing a measured speed ratio to an expected speed ratio and comparing actual switch states of mode valves to states commanded by the ETRS system. The method includes executing the remedial control action when the incorrect powerflow is detected.

19 Claims, 3 Drawing Sheets

|   | $S_A$ | $S_B$ |
|---|---|---|
| P | 0 | 0 |
| R | 0 | 1 |
| N | 1 | 1 |
| D | 1 | 0 |

|   | SOWC | C1 | C2 | C3 | C4 | C5 | C6 |
|---|---|---|---|---|---|---|---|
| P | X |   |   |   |   |   |   |
| R | X |   |   |   |   |   |   |
| N | X |   |   |   |   |   |   |
| D1L | X | X |   |   |   |   |   |
| D1 |   | X |   |   |   |   |   |
| D2 |   | X | X |   |   |   |   |
| D3 |   | X |   | X |   |   |   |
| D4 |   | X |   |   | X |   |   |
| D5 |   | X |   |   |   | X |   |
| D6 |   | X |   |   |   |   | X |
| D7 |   |   |   |   |   | X | X |
| D8 |   |   |   | X |   |   | X |
| D9 |   |   | X |   |   |   | X |

METHOD AND APPARATUS FOR TRANSMISSION RANGE MONITORING

TECHNICAL FIELD

The present disclosure relates to a method and apparatus for transmission range monitoring.

BACKGROUND

Motorized vehicles include a prime mover that generates input torque. The received input torque is transmitted across a hydrodynamic torque converter or a friction input clutch to an input member of the transmission. In a conventional geared transmission, the received input torque is transferred through one or more planetary gear sets by applying different combinations of friction clutches and brakes, and ultimately transmits output torque to a set of drive wheels at a selected gear ratio to propel the vehicle.

Typically, a desired park, neutral, reverse, drive, or low (PRNDL) transmission operating range is manually selected by the vehicle operator using a user interface device in the form of a floor-mounted or steering column-mounted PRNDL lever. In the drive (D) range, the transmission automatically shifts between available forward gear ratios based on speed, torque, driver requests, and other current vehicle operating conditions. The PRNDL lever is mechanically linked to a shift control valve of the transmission by a range shift mechanism consisting of a series of interconnected levers, push/pull rods, and cables. The number and size of such mechanical components can make it difficult to package the range shift mechanism between the driver interface device and the transmission, and can also add significant amounts of frictional resistance.

Several "shift-by-wire" range shift mechanisms have been developed to address such issues. Shift-by-wire range shift mechanisms are sometimes referred to as electronic transmission range selection (ETRS) systems. Typically, an ETRS system operates by toggling/command on/off states of solenoids disposed on fluid control valves and a park pawl so as to set up the hydraulics of a transmission to achieve a desired powerflow. Or, clutch pressures are commanded directly and a solenoid is toggled on a park pawl in other embodiments. A driver selects a desired range via a user input device, which may be embodied as a set of push buttons or a traditional lever in different designs. However, rather than physically actuating a shift valve via cable tension in the conventional manner, range selection in an ETRS system instead transmits a corresponding electronic range signal to a controller. The controller then commands movement of the transmission to a corresponding range select position.

SUMMARY

A vehicle is disclosed herein that includes a prime mover, a transmission, a user interface device, and a controller. The transmission is connected to the engine and includes clutches and an electronic transmission range selection (ETRS) system that is operable for establishing a selected park, reverse, neutral, drive (PRND) or park, reverse, neutral, drive, low (PRNDL) operating range of the transmission in response to an electric range signal. The user interface device is operable for generating the electric range signal in response to a user-selected operating range.

The controller is programmed to process the electric range signal in order to determine the user-selected operating range, and to detect an incorrect powerflow through the transmission relative to a characteristic of the operating range, e.g., clutch state, speed ratio, and/or mode valve switch states as set forth herein. The controller is also programmed to execute a remedial control action with respect to the transmission when the incorrect power flow is detected. The remedial control action may include controlling the power flow, including commanding a hydraulic neutral state or otherwise interrupting the power flow.

A control apparatus is also disclosed herein for a vehicle having the transmission noted above. The control apparatus includes the user interface device and controller.

A method for monitoring an operating range of the transmission includes determining if a power flow fault condition is present via the controller, including comparing clutches that are commanded on against a calibrated list of clutches that are not permitted to be on, and at least one of: comparing a measured speed ratio to an expected speed ratio and comparing actual switch states of a pair of mode valves to switch states commanded by the ETRS system, and then executing a remedial control action with respect to the transmission when the incorrect power flow is detected, including interrupting power flow through the transmission.

The above features and advantages and other features and advantages of the present disclosure are readily apparent from the following detailed description when taken in connection with the accompanying drawings.

DETAILED DESCRIPTION

Figure 1:
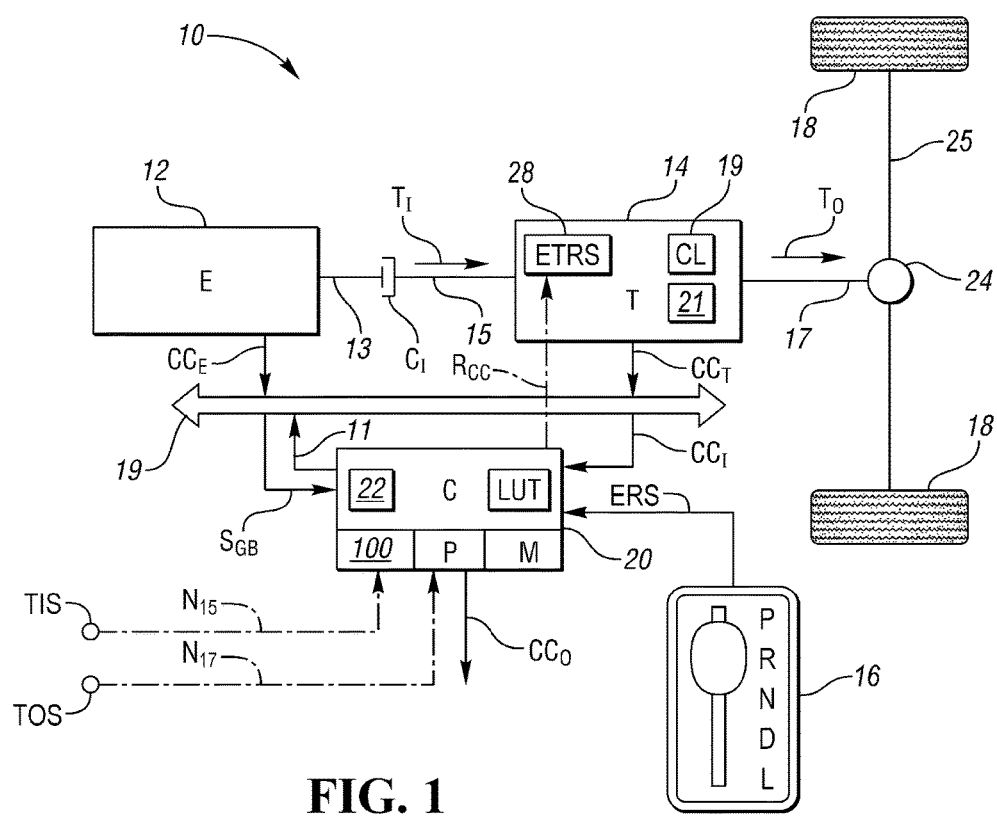
FIG. 1 is a schematic illustration of an example vehicle having a transmission and a controller programmed to execute a range monitoring method as set forth herein.

Referring to the drawings, wherein like reference numbers correspond to like or similar components throughout the several figures, an example vehicle 10 is depicted schematically in FIG. 1 as having a prime mover 12, e.g., an engine (E) as shown and/or one or more electric machines. The vehicle 10 also includes a transmission (T) 14 and a controller 20. As explained in more detail with reference to FIGS. 2-5, the controller 20 is programmed to execute a method 100 for range monitoring of the transmission 14 and to enforce remedial power flow control actions as part of the method 100. The prime mover 12 produces input torque (arrow $T_I$) that is transferred through the transmission 14 at varying speed ratios via application of one or more friction clutches (CL) 19 to drive a set of drive wheels 18. While only two drive wheels 18 are depicted schematically in FIG. 1, the vehicle 10 may have any number of drive wheels 18, any of which may be arranged at the front and/or the rear of the vehicle 10 depending on the embodiment.

The transmission 14 additionally includes an input member 15 that is connected to an output shaft 13 of the primer mover 12 via an input clutch $C_I$, e.g., a torque converter or friction clutch. The transmission 14 is configured to receive the input torque (arrow $T_I$) from the prime mover 12 across the input clutch $C_I$ and transmit an output torque (arrow $T_O$) via engagement and disengagement of selected clutches 19. A drive axle 25 receives the output torque (arrow $T_O$) from an output member 17 of the transmission 14 and powers the drive wheels 18 in order to propel the vehicle 10, possibly via a final drive unit 24 as is known in the art.

Figure 2:
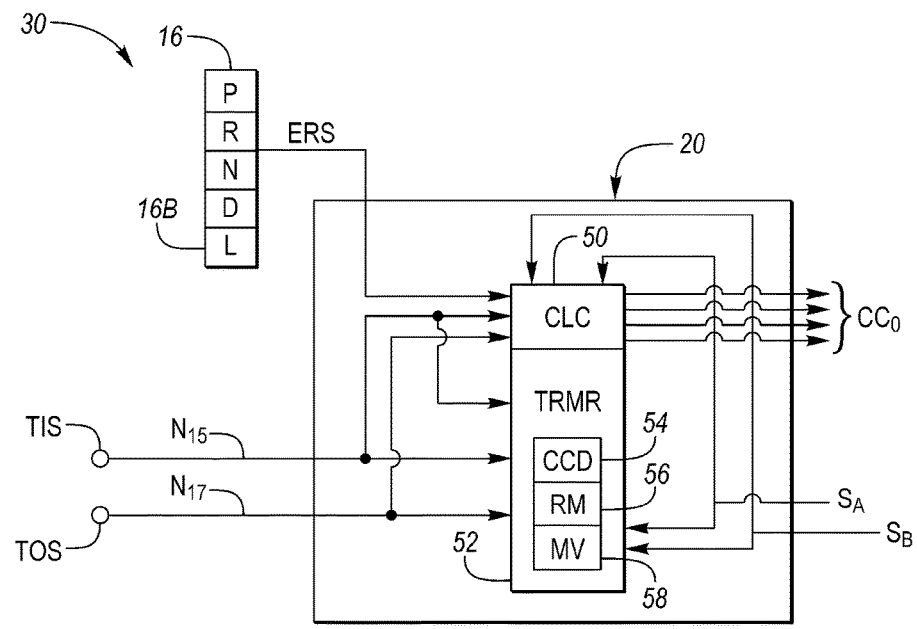
FIG. 2 is a schematic illustration of a portion of an apparatus for range monitoring in the transmission shown in FIG. 1.

The vehicle 10 includes a user interface device 16 that enables an operator of the vehicle 10 to select a desired operating range of the transmission 14. The user interface device 16 may include a conventional lever as shown in FIG. 1, or push-buttons 16B as shown in FIG. 2, or switches, dials, touch screen icons, or any other suitable input configuration. The normal transmission operating range positions include park, reverse, neutral, and drive (PRND) and possibly $1^{st}$ gear-low (L). Such PRNDL modes are selectable via interaction of an operator of the vehicle 10 with the user interface device 16.

In operation, the user interface device 16 transmits an electric range signal (arrow ERS) to the controller 20 to request the user-selected operating range. For instance, each operating range may have a corresponding voltage signal, with the electric range signal (arrow ERS) being a voltage signal that the controller 20 can receive and evaluate against information in a calibrated lookup table (LUT) to determine the user-selected operating range. In response to the electric range signal (arrow ERS), the controller 20 transmits a range control signal ($R_{CC}$) to an electronic transmission range selection (ETRS) system 28 of the transmission 14 to command a shift of the transmission 14 to the corresponding operating range.

The controller 20 of FIG. 1 is configured, i.e., programmed in software and equipped in hardware, to execute code embodying the method 100, an example of which is explained below with reference to FIG. 5. Execution of the method 100 allows the controller 20 to closely monitor operation of the transmission 14 against the user-selected operating range for any disagreement indicative of incorrect power flow, and to automatically execute remedial control actions as necessary to protect hardware of the transmission 14.

The controller 20 is programmed with allowable clutch states for each of the clutches 19 for each PRND or PRNDL operating range of the transmission 14, e.g., as one of the lookup tables (LUT), and may include a clutch connectivity detection (CCD) monitor 54 as set forth below with reference to FIG. 2 that is programmed with allowable clutch states and operable for detecting incorrect power flow, for instance by comparing actual clutch states of any of the clutches 19 involved in establishing or maintaining a given operating range against allowable clutch states for the same operating range. Example programmed structure and logic flow of the controller 20 and components of the transmission 14 are described in more detail below with reference to FIGS. 2-5.

In operation, the controller 20 shown in FIG. 1 may communicate with required elements of the vehicle 10 via communication signals (arrow 11) over a controller area network bus 19, or over any other suitable onboard communications network as shown. Various data elements are received and processed by the controller 20 in executing the method 100 and/or for maintaining overall range monitoring control over the transmission 14. For instance, the controller 20 may receive engine control values (arrow $CC_E$) and transmission control values (arrow $CC_T$) typical of transmission shift control logic. The engine control values (arrow $CC_E$) may include, by way of example, a throttle level, engine speed, engine torque, and crank position. Such values may be measured or calculated in the conventional manner and used in the overall shift control of the transmission 14. The transmission control values (arrow $CC_T$) may include similar speed and torque positions, sump temperatures, and the current PRND/PRNDL range setting of the transmission 14 via the electric range selection signal (arrow ERS).

In addition, the transmission control values (arrow $CC_T$) may include specific information usable by the controller 20 in executing the method 100, including a gearbox status signal (arrow $S_{GB}$) and clutch control input signals (arrow $CC_I$) describing clutch capacities of the various clutches 19 of the transmission 14 involved in the shift. The controller 20 may generate control output signals (arrow $CC_O$) to the clutches 19 of the transmission 14 to enforce hardware-protecting control actions. The particular values used for the gearbox status signal (arrow $S_{GB}$) and the clutch control input signals (arrow $CC_I$) may vary with the particular configuration of the transmission 14.

Example embodiments of the transmission 14 include a 9-speed and a 10-speed transmission, particularly those having a binary clutch 21 such as a selectable one-way clutch or a diode clutch that may have deployable struts or sprags that can be particularly vulnerable to hardware damage if applied or released at certain times. In some embodiments, the transmission 14 may include a transmission input sensor (TIS) and a transmission output sensor (TOS) respectively measuring an input speed ($N_{15}$) of the input member 15 and an output speed ($N_{17}$) of the output member 17, which are then communicated to the controller 20 for use in certain portions of the method 100 as described below with reference to FIGS. 2 and 5.

Still referring to FIG. 1, the controller 20 may be embodied as a computer device or multiple devices having tangible, non-transitory memory device (M) on which is recorded instructions encoding the method 100. The controller 20 may include elements as a microprocessor (P), circuitry including but not limited to a timer 22, a high-speed clock, analog-to-digital circuitry, digital-to-analog circuitry, a digital signal processor, and any necessary input/output devices and other signal conditioning and/or buffer circuitry. The memory (M) may include read only memory, e.g., magnetic and/or optical memory, as well as random access memory, electrically-erasable programmable read-only memory, and the like.

FIG. 2 depicts an ETRS control apparatus 30 that includes the controller 20 of FIG. 1 and the user interface device 16, and that may also include the TIS and TOS in some embodiments. The controller 20 is programmed with various logic modules, including a clutch control (CLC) module 50 and a transmission range monitor ring (TRMR) module 52, with the term "module" as used herein referring to programmed operating code and any required memory (M) or processor (P) hardware elements hosting and executing such code. The driver interface device 16 may include a plurality of push-buttons in the non-limiting example embodiment of FIG. 2, with a conventional lever shown in FIG. 1 as a different illustrative embodiment.

The TRMR module 52 includes multiple independent monitors providing redundant protection against occurrences of incorrect power flow in the transmission 14 of FIG.

1. As is well known in the art, traditional PRND or PRNDL shift levers are directly linked to a control valve via cables, a mechanical detent, and other hardware such that when an operator moves the lever to a corresponding range, tension on the cable physically actuates a shift valve and a manual shaft. As a result, the operator is assured, absent breakage of the cable and linking mechanisms, that the selection of a given range will shift the transmission 14 to the selected range. However, shift-by-wire designs eliminate the physical connection between the user interface device 16 and the shift valve or other shift-executing hardware of the transmission 14. The present approach is therefore intended to help provide a software and hardware-based solution protecting against unintentional application of clutches 19 of the transmission 14 for an electronically-commanded range in which such clutches 19 should not be applied.

The controller 20 may be configured with as many as three different monitors for detecting incorrect power flow in the transmission 14 of FIG. 1. Collectively, the monitors evaluate sensor outputs and other available signals to determine the present state of power flow and ensure the transmission 14 is configured to launch in terms of any of the clutches 19 that are involved in a given shift or steady-state maneuver. In the event of incorrect power flow, the controller 20 commands a remedial action that may result in a loss of power flow condition. As explained below, the present approach may be applied to different types of transmissions, including certain 9-speed transmissions and other configurations having mode valves and state switches 44A and 44B as shown in FIG. 3 and those having a bi-directional or dual-channel TIS, e.g., certain 10-speed transmissions.

Specifically, the controller 20 may be equipped with up to three monitors, any two of which may run simultaneously: the clutch connectivity detection (CCD) monitor 54, a ratio monitor (RM) 56, and a mode valve (MV) monitor 58. The CCD 54 may be used with any multi-speed transmission, and is operable for computing a power flow fault condition by comparing clutches 19 that are applied/on against a list of clutches 19 that, according to calibrated programming, are not permitted to be applied for a given range.

The RM 56 may be used in transmissions having a bi-directional TIS operable for determining a magnitude and a sign of a measured speed, and in which a real-time speed ratio is computed via the controller 20 at all times and a direction of rotation or sign is evaluated for proper direction/sign. A power flow fault condition is recorded by the controller 20 if the measured ratio is different than an expected ratio, with the RM 56 configured to intercept the fault condition as early in a launch as possible. In other words, the RM 56 is operable for computing a magnitude and sign of a speed ratio of the transmission 14 in real time, and for detecting the incorrect power flow through the transmission 14 when the magnitude and sign of the computed speed ratio does not match a calibrated expected ratio magnitude and sign for the selected range.

Figure 3:
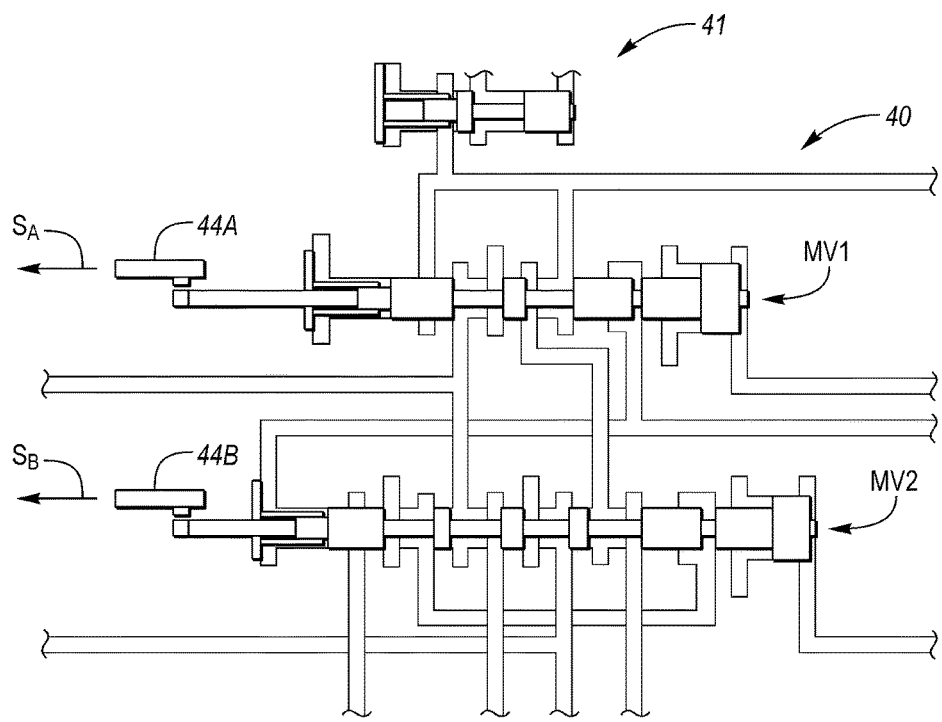
FIG. 3 is a schematic illustration of an example mode valve usable in some embodiments of the vehicle shown in FIG. 1.

The MV monitor 58 may be used in transmission configurations having mode valves with associated state switches, e.g., as shown in FIG. 3. Such a mode valve prescribes a particular oil flow which guarantees a particular clutch application, as is known in the art. The MV monitor 58 compares the switch states to states commanded by the ETRS 28 of FIG. 1. A power flow fault condition is detected by comparing expected switch states to actual/measured states, subject to certain constraints such as start-stop events of the prime mover 12. All of the monitors may be subject to changing conditions, such as settling time since a prior range change, clutch fill progression, oil temperature, and other calibrations, and are configured to accommodate shifts for stationary garage shifts, rolling garage shifts, and rolling-hill garage shifts.

The CCD monitor 54 computes a power flow fault condition such as by comparing clutches 19 that are applied against a list of clutches 19 that are prohibited by calibration to be applied. An example truth table is depicted in FIG. 4B for a 9-speed transmission having a selectable one-way clutch, e.g., the binary clutch 21 of FIG. 1, and rotating or braking friction clutches C1, C2, C3, C4, C5, and C6 as the clutches 19. The possible operating ranges of the transmission 14 in this embodiment include park (P), reverse (R), neutral (N), drive $1^{st}$ gear low (D1L), and nine forward drive modes (D1-D9), with "X" representing an engaged or applied clutch 19. Likewise, the absence of an X indicates a released clutch 19. If there is agreement between the clutches 19 that are applied and those that are not supposed to be applied, a power flow fault condition exists. If the fault condition is present for longer than a calibrated duration as determined via the timer 22 of FIG. 1, the controller 20 commands execution of a remedial action as part of the method 100.

Specifically, for a commanded operating range of drive (D), the CCD monitor 54 compares the set of clutches 19 that are applied (X) against clutch apply states that would generate a power flow of reverse (R). The CCD monitor 54 reports a fault condition and takes remedial action if any or all of the clutches 19 generating reverse power flow are applied for a calibrated duration. Likewise, for a command of reverse (R), the CCD monitor 54 compares the set of clutches 19 that are applied against states that generate a power flow of any of the drive (D) ranges, and records a fault condition and takes remedial action if any or all of the clutches 19 that generate a drive power flow are applied for a calibrated duration. Park/neutral (P/N) is handled in a similar manner, i.e., the CCD monitor 54 compares the clutches 19 that are applied to those generating a non-neutral power flow, and takes remedial action when any/all of the clutches 19 for a non-neutral power flow are applied for a calibrated duration.

Further with respect to the RM 56, which relies on the presence of a bi-directional TIS as noted above, this monitor detects a power flow fault condition in a different manner. The role of the RM 56 is to compute the fault condition based on whether or not there is agreement between a commanded operating range and an achieved power flow as indicated by the measured speed ratio. The speed ratio may be computed utilizing raw, fast-loop TIS and TOS data, e.g., in 6.5 ms loop. The speed ratio has a direction or sign, with a positive signed ratio indicating the power flow is configured for forward drive and a negative signed ratio indicating the power flow is configured for reverse drive, both of which are independent of fore/aft roll of the vehicle 10. For an intended direction of reverse (R), a fault may be recorded if the current operating range is reverse, the vehicle speed exceeds a high threshold or does not exceed a low threshold, and the measured ratio is greater than a calibrated ratio. For an intended direction of forward drive, a fault may be recorded if the vehicle speed exceeds a high threshold or does not exceed a low threshold, and the measured ratio is less than a calibrated ratio.

The MV monitor 58 monitors of operations of transmissions 14 having a mode valve system 40, as is schematically depicted in FIG. 3. Such a mode valve system 40 includes separate mode valves MV1 and MV2 and a mode enable valve 41. Each mode valve MV1 and MV2 has a corresponding switch 44A, 44B with corresponding binary switch states $S_A$ and $S_B$, i.e., 1=ON and 0=OFF, providing for different modes of operation. FIG. 4A depicts a truth table for mode valves for an example PRND range, with the truth table populated by the binary 0/1 states. The MV monitor 58 of FIG. 2 compares the actual switch states of the mode valves MV1 and MV2, which determine how oil flows in a valve body (not shown), to the commanded mode from the ETRS system 28. A fault may be recorded if the actual states of the switches 44A and 44B do not equal the switch states commanded by the ETRS system 28. Additionally, the MV monitor 58 does not report a hazard when the prime mover 12 is turned off, e.g., during start-stop maneuvers.

Figures 4A, 4B, 5:
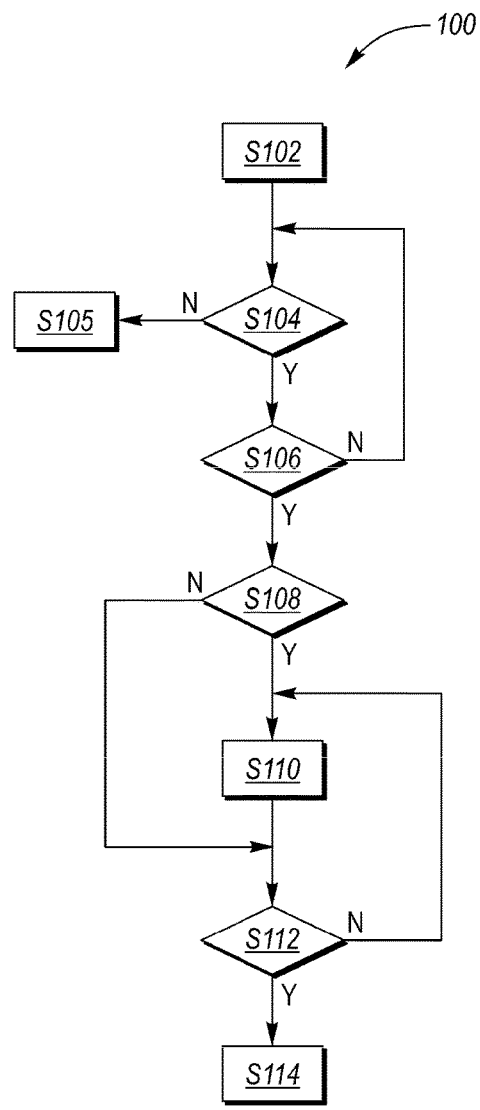
FIG. 4A is a table describing example binary switch states for the mode valve of FIG. 3.
FIG. 4B is a table describing an illustrative combination of applied clutches for various operating ranges in an example 9-speed embodiment of the transmission shown in FIG. 1.
FIG. 5 is a graphical flow chart describing an example method for range monitoring in the transmission shown in FIG. 1.

FIG. 5 is a flow chart for an example embodiment of the method 100 for range monitoring in the transmission 14 of FIG. 1. As noted above, the CCD monitor 54 may be used for any transmission 14, while the choice between RM 56 and the MV monitor 58 depends on the availability of a bi-directional TIS and use of mode valves, respectively. Nothing precludes using all three monitors 52 in a given transmission 14, although two monitors 52 may provide sufficient redundancy for improving the robustness of any vehicle having an ETRS system 28 as shown in FIG. 1.

The method 100 enables monitoring of a range of the transmission 14 described above. The method includes, in general terms, determining if a powerflow fault condition is present via the controller 20, including comparing clutches 19 that are commanded on against a calibrated list of clutches 19 that are not permitted to be on, and at least one of two other monitoring approaches, i.e., (I) comparing a measured speed ratio to an expected ratio and (II) comparing actual switch states of a pair of mode valves to states commanded by the ETRS system 28. As part of the method 100, the controller 20 executes a remedial control action with respect to the transmission 14 when the incorrect power flow is detected, including interrupting power flow through the transmission 14.

Beginning with step S102, the controller 20 of FIG. 1 determines if a power flow fault condition is present using some or all of the monitors of the TRMR 52 shown in FIG. 2 and described above. Step S102 includes using two or more of the CCD monitor 54, the RM 56, and the MV monitor 58. When using the CCD monitor 54, step S102 may include comparing clutches 19 that are commanded on against a list of clutches 19 that, according to calibrated programming, are not permitted to be applied or on. As shown in FIG. 2, the CLC module 50 generates the various clutch commands, collectively shown as arrow $CC_O$, which are transmitted to the corresponding active/applied clutches of the transmission 14. The same signals are fed into the TRMR 52 and used by the CCD monitor 50 as part of step S102. The list of clutches 19 that should be on for a given range is calibrated in memory (M) of the controller 20, as exemplified in FIG. 4B. The RM 56 indicates a fault condition if a measured speed ratio from the TIS and TOS is different than an expected ratio. The MV monitor 58 compares binary switch states from the switches $S_A$, $S_B$, which may be optionally determined via voltage or current sensing in the typical manner, to switch states commanded by the ETRS system 28 shown in FIG. 1, and indicates a fault condition when the expected switch states do not match the measured switch states $S_A$ and $S_B$. Upon detecting a fault condition, the controller 20 starts the timer 22 and proceeds to step S104.

Step S104 includes determining, after a calibrated duration, whether the fault condition detected at step S102 remains ongoing. If not, the method 100 proceeds to step S105. The method 100 proceeds to step S106 if the fault condition is ongoing after the calibrated duration has expired.

Step S105 entails recording a diagnostic code in memory (M) that the fault condition detected at step S102 has cleared. The controller 20 may thereafter proceed with control of the transmission 14 in the usual manner.

At step S106, the controller 20 allows the timer 22 to continue to advance for a second calibrated duration, such as about 200-300 ms. Steps S104 and S106 continue in a loop until the controller 20 determines at step S106 that the fault condition has persisted beyond the second calibrated duration, at which point the method 100 proceeds to step S108.

Steps S108-S112 are executed in a loop to ensure that the clutches 19 and associated pressure control valves of the transmission 14 are in a prepared state for execution of the remedial control action to occur at step S114. Some transmissions 14 may include particularly fragile or sensitive hardware, such as the binary clutch 21 shown schematically in FIG. 1. For instance, some transmissions 14 use fluid power to move a blocking ring and thereby depress or release spring-loaded sprags or struts to hold torque in one or two rotational directions, or to permit freewheeling. Such torque holding elements, unlike friction elements that are designed to slip over various levels of partial engagement, may fracture if quickly applied or released under certain force conditions.

Therefore, step S108 may entail verifying that any valves used for control of the blocking ring are properly staged. Step S108 may entail receiving valve position data, which is known in conventional shift control architectures and part of the clutch control input signals (arrow $C_I$), and determining if the pressure control solenoids and clutch select solenoids (not shown) are appropriately set for eventual execution of step S114. If the control valves are properly staged, the method 100 proceeds directly to step S114. Otherwise, the method 100 proceeds to step S110.

Step S110 includes commanding any pressure control solenoids and clutch select valves to zero, thereby reducing pressure to the controlled clutches 19 and any binary element such as the binary clutch 21. Step S110 could also include measuring slip across the binary clutch 21 to determine if the binary clutch 21 is overrunning, and then staging pressure to place the binary clutch 21 into a favorable state for execution of step S114, i.e., so the binary clutch 21 is not commanded on or off too quickly. The method 100 then proceeds to step S112.

Step S112 includes determining the timer 22 has reached another calibrated duration such as 500 ms. Step S112 may be repeated with step S110 until the calibrated duration has been met. The method 100 then proceeds to step S114.

At step S114, the controller 20 of FIGS. 1 and 2 may execute a default remedial control action to protect against improper power flow. Control actions responsive to such power flow fault conditions may include commanding entry of the transmission 14 into a hydraulic default mode, and controlling a state of the clutches to interrupt the power flow, e.g., by causing interruption or loss in power flow through the transmission 14. For instance, the controller 20 may command pulling or disconnection of voltage to high-side control drivers for any affected clutch control solenoids. In this manner, the method 100 may improve drive quality and enhance the drive experience by providing for pre-remedial actions short of drive-compromising remedial actions.

While the best modes for carrying out the present disclosure have been described in detail, those familiar with the art to which this disclosure relates will recognize various alternative designs and embodiments for practicing the disclosure within the scope of the appended claims.

The invention claimed is:

1. A vehicle comprising:
   a prime mover;
   a transmission connected to the prime mover, the transmission having a plurality of clutches and an electronic transmission range selection (ETRS) system operable for establishing a park, reverse, neutral, drive (PRND) or a park, reverse, neutral, drive, low (PRNDL) operating range of the transmission in response to an electric range selection (ERS) signal;
   a user interface device operable for generating the ERS signal in response to selection of the operating range; and
   a controller programmed to process the ERS signal to thereby monitor the selected operating range, detect when the ERS signal corresponds to an incorrect power flow through the transmission, and execute a remedial control action with respect to the transmission when the ERS signal is indicative of the incorrect power flow, the remedial control action including controlling a state of the clutches to interrupt the incorrect power flow and thereby cause a loss of power flow through the transmission.

2. The vehicle of claim 1, wherein the prime mover is an internal combustion engine and the transmission is a multi-speed automatic transmission.

3. The vehicle of claim 1, wherein the controller is programmed with allowable clutch states for each of the plurality of clutches for each PRND or PRNDL operating range of the transmission, and includes a clutch connectivity detection monitor operable for detecting whether the selected operating range corresponds to the incorrect power flow by comparing actual clutch states against the allowable clutch states.

4. The vehicle of claim 3, further comprising a transmission input speed sensor and a transmission output speed sensor, wherein the controller further includes a ratio monitor operable for computing a magnitude and a sign of a speed ratio of the transmission in real time, and for detecting the incorrect power flow through the transmission when the magnitude and sign of the computed speed ratio do not match a calibrated expected ratio magnitude and sign for the selected operating range.

5. The vehicle of claim 3, wherein the transmission includes a pair of mode valves each having an associated mode valve switch, and wherein the controller includes a mode valve monitor operable for comparing actual switch states of the mode valve switches to commanded switch states, and for detecting the incorrect power flow through the transmission when the actual switch states and the commanded switch states do not match.

6. The vehicle of claim 1, wherein the remedial control action includes commanding entry of the transmission into a hydraulic default mode.

7. The vehicle of claim 1, wherein the user input device includes push buttons each corresponding to one of the park, reverse, neutral, drive, and low ranges.

8. A control apparatus for a vehicle having a transmission having an electronic transmission range selection (ETRS) system operable for establishing a park, reverse, neutral, drive (PRND) or park, reverse, neutral, drive, low (PRNDL) range of the transmission in response to an electric range selection (ERS) signal, the control apparatus comprising:
   a user interface device; and
   a controller programmed to process the ERS signal to determine the user-selected operating range by, detect when the ERS signal corresponds to an incorrect power flow through the transmission, and execute a remedial control action with respect to the transmission the ERS signal is indicative of the incorrect power flow, including controlling a state of the clutches to interrupt the incorrect power flow and thereby cause a loss of power flow through the transmission.

9. The control apparatus of claim 8, wherein the controller is programmed with a lookup table listing allowable clutch states for each of the clutches for each operating range of the transmission, and includes a clutch connectivity detection monitor operable for detecting the incorrect power flow by comparing actual clutch states against the allowable clutch states from the table.

10. The control apparatus of claim 9, further comprising a transmission input speed sensor and a transmission output speed sensor, wherein the controller further includes a ratio monitor operable for computing a magnitude and sign of a speed ratio of the transmission in real time, and for detecting the incorrect power flow through the transmission when the magnitude and sign of the computed speed ratio does not match a calibrated expected ratio magnitude and sign for the selected operating range.

11. The control apparatus of claim 10, wherein the transmission includes a pair of mode valves each having an associated mode valve switch, and wherein the controller includes a mode valve monitor operable for comparing actual switch states of the mode valve switches to commanded switch states, and for detecting the incorrect power flow through the transmission when the actual switch states and the commanded switch states do not match.

12. The control apparatus of claim 9, wherein the transmission includes a pair of mode valves each having an associated mode valve switch, and wherein the controller includes a mode valve monitor operable for comparing actual switch states of the mode valve switches to commanded switch states, and for detecting the incorrect power flow through the transmission when the actual switch states and the commanded switch states do not match.

13. The control apparatus of claim 8, wherein the remedial control action includes commanding entry of the transmission into a hydraulic default mode.

14. The control apparatus of claim 8, wherein the user input device includes push buttons each corresponding to one of the park, reverse, neutral, drive, and low ranges.

15. A method for monitoring a range of a transmission in a vehicle having a prime mover and a transmission that is connected to the engine and has a plurality of clutches and an electronic transmission range selection (ETRS) system operable for establishing a park, reverse, neutral, drive (PRND) or park, reverse, neutral, drive, low (PRNDL) range of the transmission in response to an electric range selection (ERS) signal, the method comprising:
   determining if a power flow fault condition is present via the controller, the power flow fault condition being present when the ERS signal corresponds to an incorrect power flow through the transmission, including comparing clutches that are commanded on against a calibrated list of clutches that are not permitted to be on and at least one of: comparing a measured speed ratio to an expected ratio and comparing actual switch states of a pair of mode valves to switch states commanded by the ETRS system; and
   executing a remedial control action with respect to the transmission when the ERS signal is indicative of the power flow fault condition, including controlling a state of the clutches to interrupt the incorrect power flow and thereby cause a loss of power flow through the transmission.

16. The method of claim 15, wherein determining if a power flow fault condition is present includes comparing the measured speed ratio to an expected ratio and comparing the actual switch states of the mode valves to switch states commanded by the ETRS system.

17. The method of claim 15, wherein executing a remedial control action includes commanding entry of the transmission into the hydraulic default mode by pulling high-side control drivers for the clutches.

18. The method of claim 15, wherein the vehicle includes a transmission input speed sensor and a transmission output speed sensor, and wherein the measured speed ratio includes a magnitude and sign.

19. The method of claim 15, wherein the transmission includes a pair of mode valves each having an associated mode valve switch, and wherein determining if the power flow fault condition is present includes comparing actual switch states of the pair of mode valves to states commanded by the ETRS system.

\* \* \* \* \*